No. 843,666. PATENTED FEB. 12, 1907.
W. S. DAVENPORT.
CHUCK.
APPLICATION FILED NOV. 4, 1901.

WITNESSES,
James H. Thurston
Catherine G. Bradley.

INVENTOR,
William S. Davenport
BY Wilmarth H. Thurston
ATT'Y.

UNITED STATES PATENT OFFICE.

WILLIAM S. DAVENPORT, OF NEW BEDFORD, MASSACHUSETTS, ASSIGNOR TO BROWN AND SHARPE MANUFACTURING COMPANY, OF PROVIDENCE, RHODE ISLAND, A CORPORATION OF RHODE ISLAND.

CHUCK.

No. 843,666.  Specification of Letters Patent.  Patented Feb. 12, 1907.

Application filed November 4, 1901. Serial No. 81,111.

*To all whom it may concern:*

Be it known that I, WILLIAM S. DAVENPORT, formerly of the city and county of Providence, in the State of Rhode Island, but now residing at New Bedford, in the county of Bristol and State of Massachusetts, have invented certain new and useful Improvements in Chucks; and I do hereby declare the following specification, taken in connection with the accompanying drawings, forming a part of the same, to be a full, clear, and exact description thereof.

The object of the invention is to provide a chuck of the lathe-chuck type—that is, a chuck having radially-adjustable jaws, in which the jaws may not only be adjusted for different sizes of stock, but may also be readily opened and closed for removing and inserting the work or to permit the stock to be fed, thereby adapting the chuck for use in an automatic screw-machine or other similar machines where a rod of stock is to be intermittently fed.

The invention consists in the combinations and arrangements of parts hereinafter described and claimed.

Figure 2:
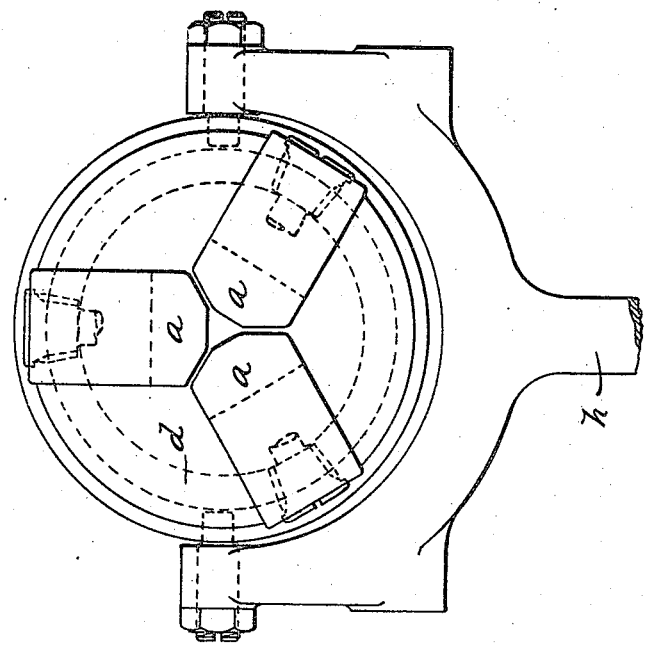
Figure 1:
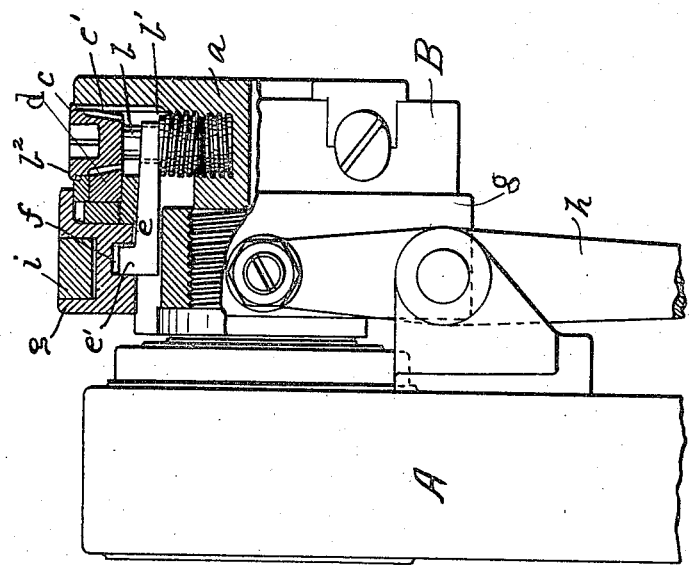

Referring to the drawings, Figure 1 is a side elevation of a chuck embodying my invention, together with a portion of one of the bearings for the chuck-spindle, the same being partly in section; and Fig. 2 is an end elevation thereof.

A is one of the bearings for the spindle, to which the chuck B is secured. The chuck-jaws $a$ are arranged to slide in radial ways formed in the body of the chuck. Each of these jaws is provided with an adjusting-screw $b$ for adjusting the jaw toward and from the axis of the chuck, whereby the jaws may be adjusted to act upon stock of different diameters. The head $c$ of each of said adjusting-screws is provided with gear-teeth $c'$. An annular rack $d$, mounted to turn in the body of the chuck, is arranged to engage the gear-teeth on each of said adjusting-screws and so that a turning of any one of the screws $b$ will serve to adjust all of the jaws simultaneously toward or from the axis of the chuck.

Wedges $e$, one for each jaw, are arranged to slide in suitable grooves or ways formed in the body of the chuck. The forward end of each wedge is forked to embrace the shank of the screw $b$, and this forked end of the wedge engages and bears against a shoulder $b'$, formed on the screw $b$. Each wedge on its opposite side bears against the body of the chuck. The wedge, therefore, backed up by the body of the chuck serves as a bearing for the adjusting-screw when the latter is turned to move the jaw inward. The head of each screw is provided with an annular flange $b^2$, which enters a countersunk recess in the body of the chuck, the bottom of said recess serving as a bearing for the screw when it is turned to move the jaw outward. Thus a turning of the screw $b$ in one direction or the other will serve to adjust the jaw $a$ toward or from the axis of the chuck. Whatever may be the adjusted position of the jaw, a sliding of the wedge $e$ from left to right in Fig. 1 will serve to force the jaw inward toward the axis of the chuck to grip the stock, while a sliding of the wedge in the opposite direction will release the jaw. A sufficient clearance between the under side of the flange $b^2$ and the bottom of the recess therefor in the body of the chuck is provided to permit of the requisite inward movement of the jaw and adjusting-screw under the action of the wedge $e$. Preferably a clearance between the gear-teeth $c'$ and the teeth of the annular rack $d$ is also provided sufficient to prevent binding of the parts when the adjusting-screw is moved inward.

Each wedge is provided at its rear end with a lug or projection $e'$, adapted to enter an annular groove $f$, formed on the inside of a sliding sleeve or collar $g$. When a sliding movement is imparted to the sleeve $g$, all the wedges will be acted upon simultaneously and all the jaws simultaneously opened or closed. Any suitable means may be employed for sliding the sleeve $g$ in one direction or the other. In the drawings is shown a forked lever $h$, engaging a ring $i$, located in an annular groove formed in the outer periphery of the sliding sleeve.

In the drawings a chuck provided with three jaws is shown; but it will be understood that any number of jaws may be employed, there being an adjusting-screw and coöperating wedge for each jaw.

It is preferred to actuate all of the jaws in opening and closing the chuck. If it should be desired, however, to actuate only one of the jaws in opening and closing, it would be necessary to employ only one actuating-wedge—that is, an actuating-wedge for the adjusting-screw of that one jaw.

It will be understood that with the construction and arrangement of parts above described the jaws may be opened and closed without stopping the rotation of the chuck-spindle. It will also be understood that by omitting the annular connecting-rack the jaws may be adjusted separately and the chuck be thus adapted to hold the stock eccentrically or to hold stock or work of irregular shape.

What I claim as my invention, and desire to secure by Letters Patent, is—

1. In a chuck, the combination, with the chuck-body, of radially-adjustable jaws, screws for adjusting said jaws toward or from the axis of the chuck, wedges mounted in ways in the chuck-body and arranged to act upon said adjusting-screws, and means for actuating said wedges to close and open the jaws.

2. In a chuck, the combination, with the chuck-body, of a radially-adjustable jaw, a screw for adjusting said jaw toward or from the axis of the chuck, said adjusting-screw being provided with a shoulder, a wedge mounted in ways in the chuck-body and bearing against said shoulder, and means for actuating said wedge to close and open said jaw, said wedge also constituting a bearing for said adjusting-screw.

3. In a chuck, the combination, with the chuck-body, of radially-adjustable jaws, screws for adjusting said jaws, each of said adjusting-screws being provided with a shoulder, wedges mounted in ways in the chuck-body and arranged to bear against said shoulders, and a sliding sleeve for actuating said wedges to close and release the jaws, said wedges constituting bearings for the adjusting-screws.

WILLIAM S. DAVENPORT.

Witnesses:
FRANK W. CRAIG,
CHARLES MITCHELL